(12) United States Patent
Lorentsson et al.

(10) Patent No.: US 11,052,731 B2
(45) Date of Patent: Jul. 6, 2021

(54) VEHICLE FLUSH WINDOW SYSTEM, A VEHICLE COMPRISING SAME, AND RELATED ASSEMBLY METHOD

(71) Applicant: VOLVO CAR CORPORATION, Gothenburg (SE)

(72) Inventors: Andreas Lorentsson, Hisings Backa (SE); Mikael Angermund, Gothenburg (SE); Mats Jonsson, Gothenburg (SE); Aakash Narender Singh, Gothenburg (SE); Jonas Alveflo, Kungsbacka (SE); Marcus Albo, Hisings Kärra (SE); Angelica Bergendahl, Trollhättan (SE)

(73) Assignee: VOLVO CAR CORPORATION, Gothenburg (SE)

(*) Notice: Subject to any disclaimer, the term of this patent is extended or adjusted under 35 U.S.C. 154(b) by 201 days.

(21) Appl. No.: 16/375,387

(22) Filed: Apr. 4, 2019

(65) Prior Publication Data

US 2020/0247220 A1 Aug. 6, 2020

Related U.S. Application Data

(60) Provisional application No. 62/801,192, filed on Feb. 5, 2019.

(51) Int. Cl.
*E06B 7/16* (2006.01)
*B60J 1/17* (2006.01)
(Continued)

(52) U.S. Cl.
CPC ............... *B60J 1/17* (2013.01); *B60J 10/79* (2016.02); *E05F 11/52* (2013.01); *E05Y 2900/55* (2013.01)

(58) Field of Classification Search
CPC .... B60J 1/17; B60J 10/79; B60J 10/76; E05F 11/52; E05Y 2900/55
(Continued)

(56) References Cited

U.S. PATENT DOCUMENTS 8,793,938 B2 8/2014 Grudzinski et al.
9,597,949 B2 * 3/2017 Nojiri ...................... B60J 10/76
(Continued)

FOREIGN PATENT DOCUMENTS

FR      3060467 A1    6/2018
WO   WO2017076511 A1  5/2017
WO   WO2018109061 A1  6/2018

*Primary Examiner* — Jerry E Redman
(74) *Attorney, Agent, or Firm* — Berenato & White, LLC

(57) ABSTRACT

A vehicle flush window system is provided for a vehicle door including a door window. The system includes a slider member, a guide structure, a glass run seal, and a capping carrier. The slider member is configured to be secured to an interior surface of the door window. The guiding structure is mountable on the vehicle door. The guiding structure includes a receiving bracket having a guide channel configured to slidingly receive the slider member. The glass run seal is interposed between the receiving bracket and the slider member in the guide channel. The capping carrier is configured to retain the seal, and mount a cover in flush relation to an exterior surface of the door window, when the interior surface of the door window is secured to the slider member and the slider member is slidingly received in the guide channel in a window closed position.

18 Claims, 10 Drawing Sheets

(51) Int. Cl.
  *B60J 10/79*   (2016.01)
  *E05F 11/52*   (2006.01)
(58) Field of Classification Search
  USPC ........................................ 49/440, 441, 495.1
  See application file for complete search history.

(56) References Cited

U.S. PATENT DOCUMENTS

| | | | |
|---|---|---|---|
| 10,167,659 | B2 | 1/2019 | Sagisaka et al. |
| 10,427,511 | B2 * | 10/2019 | Blottiau ................. B60J 5/0402 |
| 10,434,856 | B2 * | 10/2019 | Dosaki .................... B60J 10/27 |
| 10,442,281 | B2 | 10/2019 | Krause |
| 10,479,173 | B2 * | 11/2019 | Krause ................... B60J 5/0402 |
| 2006/0021282 | A1 * | 2/2006 | Tamaoki ................. B60J 10/74 49/441 |
| 2006/0037249 | A1 * | 2/2006 | Kawamura .............. B60J 10/74 49/414 |
| 2012/0025564 | A1 | 2/2012 | Ellis et al. |
| 2013/0061533 | A1 | 3/2013 | Grudzinski et al. |
| 2014/0223830 | A1 * | 8/2014 | Shigehiro ................ B60J 10/24 49/495.1 |
| 2017/0129318 | A1 * | 5/2017 | Uemura ................... B60J 5/0402 |
| 2017/0145723 | A1 * | 5/2017 | Sagisaka ................ E05D 15/165 |
| 2018/0313139 | A1 * | 11/2018 | Nishikawa ............... B60J 10/74 |
| 2018/0319260 | A1 * | 11/2018 | Krause ................... B60J 10/265 |
| 2018/0319261 | A1 * | 11/2018 | Krause ....................... B60J 1/17 |
| 2018/0339576 | A1 | 11/2018 | Heppner et al. |
| 2020/0086727 | A1 * | 3/2020 | Guellec ....................... B60J 1/17 |
| 2020/0086728 | A1 * | 3/2020 | Roux ..................... B60J 10/248 |
| 2020/0114737 | A1 * | 4/2020 | Choi ...................... B60J 5/0402 |
| 2020/0180405 | A1 * | 6/2020 | Blottiau .................. B60J 10/79 |
| 2020/0338966 | A1 * | 10/2020 | Veille ......................... B60J 1/17 |

* cited by examiner

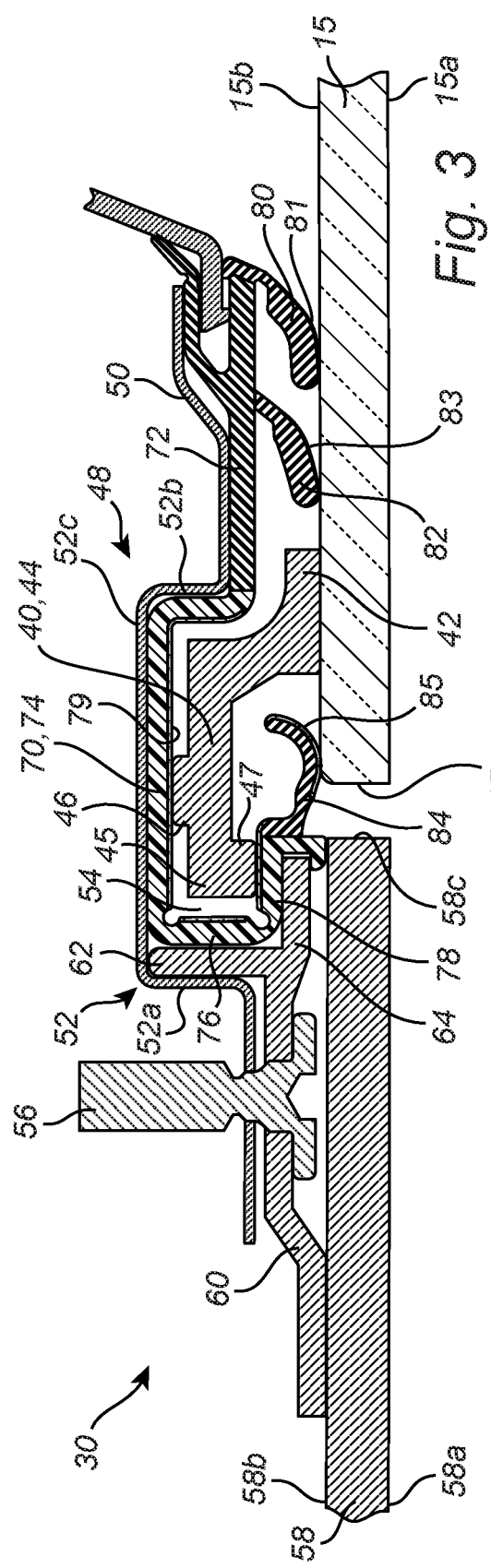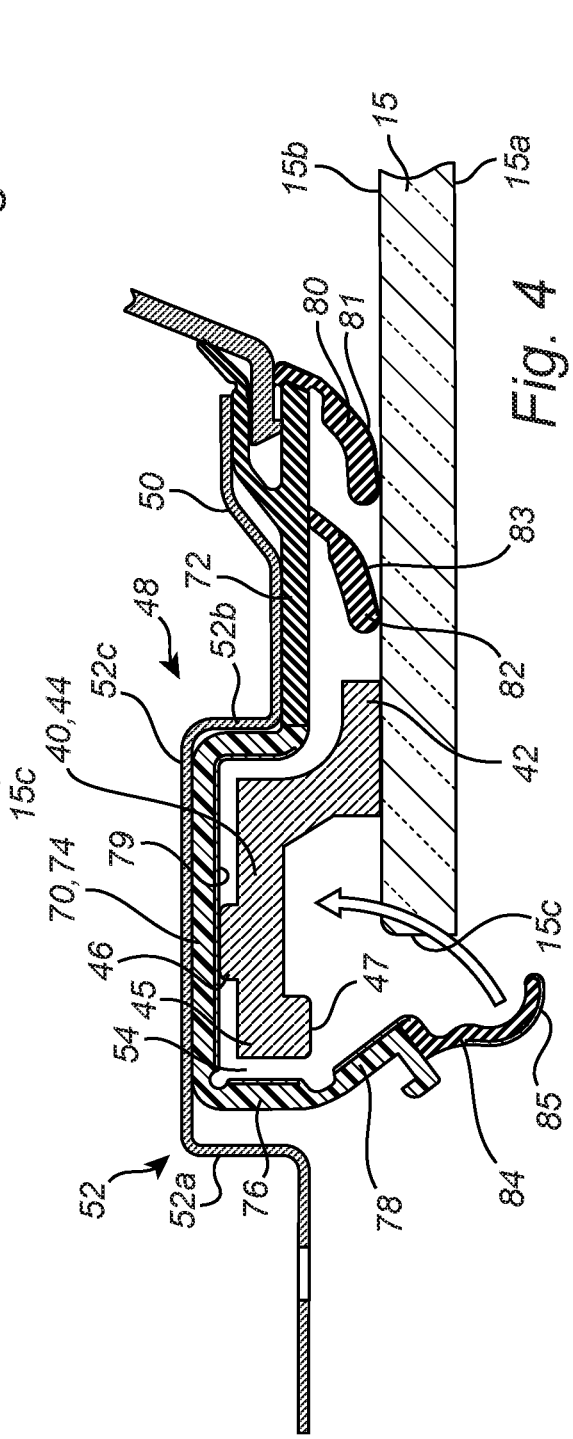

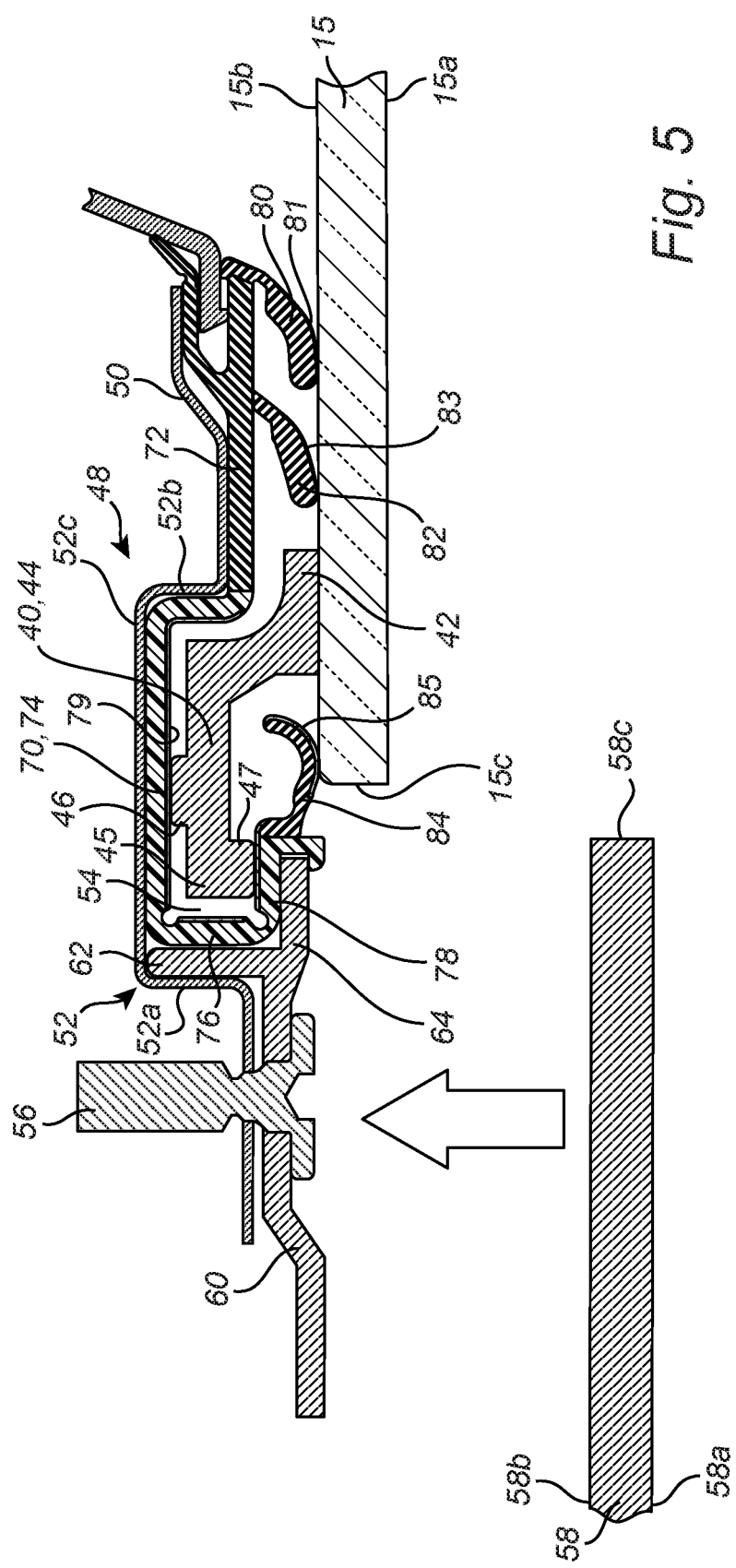

ND RELATED ASSEMBLY METHOD

VEHICLE FLUSH WINDOW SYSTEM, A VEHICLE COMPRISING SAME, AND RELATED ASSEMBLY METHOD

CLAIM OF PRIORITY AND CROSS-REFERENCE TO RELATED APPLICATIONS

This application claims the benefit of priority of U.S. Provisional Application No. 62/801,192 filed on Feb. 5, 2019, the complete disclosure of which is incorporated herein by reference.

TECHNICAL FIELD

The present invention relates to a vehicle flush window system, to a vehicle including the vehicle flush window system, and a method of assembling the vehicle flush window system on a vehicle.

BACKGROUND ART

Motor vehicles for land use include sedans, coupes, sports utility vehicles (also known as SUVs), and hatchbacks. Sedans and coupes typically have four side doors and two side doors, respectively. Each door typically includes a window frame with an opening, and a corresponding glass window. The vehicle operator or passenger can selectively cause the window(s) to be raised to close the window opening, and to be lowered, to open the window opening. When lowered into the open position, the window is received in a cavity within the door, typically between an outer door panel or skin and an inner door panel. On the other hand, when raised into the closed position, peripheral edges of the window are typically received in lateral, U-shaped glass runs with legs contacting the interior and exterior surfaces of the glass window. The legs of the U-shaped glass runs operate to guide movement of the window during the raising and lowering operations.

Typically, decorative appliques/covers are mounted over the glass runs so as to conceal the glass runs and improve the aesthetic appearance of the vehicle. However, the decorative appliques/covers typically project outwardly beyond the exterior surface of the window, so that the window is set back with respect to the appliques/covers. This non-flush interface between the glass and the appliques/covers can create aerodynamic drag, especially at high vehicle speeds, limiting the vehicle's fuel efficiency and speed.

There has been a trend towards equipping sedans and coupes, especially luxury models, with door windows that are flush with the decorative appliques/covers. The flush relationship suppresses wind noise and improves aerodynamics of the vehicle. Moreover, the flush relationship is aesthetically desired by many consumers. However, the U-shaped glass runs with legs contacting the interior and exterior surfaces of the glass window is impractical for flush door windows, because the glass runs protrude outwardly beyond the exterior surface of the window glass.

SUMMARY

According to exemplary aspects and embodiments of the present invention, a vehicle flush glass system is provided. According to a first aspect of the invention, the system includes a window glass mounted slider member, a door mounted guide structure to receive the slider member, a glass run seal, and a capping carrier. The slider member is secured to an interior surface of the window. The guide structure, receiving at least a portion of the slider member, is mounted on and within the vehicle door. The guide structure further includes a receiving bracket having a guide channel to slidingly receive the slider member. The glass run seal is interposed between the receiving bracket and the slider member in the guide channel. The glass run seal both locates and seals the glass, at the respective end portions of the seal, vis-à-vis the interior window surface. The capping carrier is configured both: toretain the seal in the guide structure; and to mount a cover, in flush relation to an exterior surface of the door window, when the door window is secured to the slider member and the slider member is slidingly received in the guide channel in the closed position.

A second aspect of the invention is directed to a vehicle flush window system for a vehicle door including a door window having an exterior surface and an opposite interior surface. The vehicle flush window system includes a slider member configured to be secured to an interior surface of the door window, and a guiding structure mountable on the vehicle door. The guiding structure includes a receiving bracket having a guide channel configured to slidingly receive at least part of the slider member, a glass run seal at least a portion of which is configured to be interposed between the receiving bracket and the slider member when the at least part of the slider member is slidingly received in the guide channel, and a capping carrier configured to secure a cover in flush relation to an exterior surface of the door window when the interior surface of the door window is secured to the slider member and the at least part of the slider member is slidingly received in the guide channel.

A third aspect of the invention provides a vehicle flush window system secured to a vehicle door including a door window with an exterior surface and an opposite interior surface. The vehicle flush window system includes a slider member secured to the interior surface of the door window, and a guiding structure mounted on the vehicle door. The guiding structure comprises a receiving bracket having a guide channel slidingly receiving at least part of the slider member, a glass run seal at least a portion of which is interposed between the receiving bracket and the slider member, and a capping carrier securing the glass run seal in contact with the slider member. The system further comprises a cover secured by the capping carrier in flush relation to the exterior surface of the door window.

A fourth aspect of the invention provides a vehicle comprising a door including a door window having an exterior surface and an opposite interior surface, and a vehicle flush window system comprising a slider member secured to the interior surface of the door window, a guiding structure mounted on the vehicle door, and a cover. The guiding structure comprising a receiving bracket having a guide channel slidingly receiving at least part of the slider member, a glass run seal at least a portion of which is interposed between the receiving bracket and the slider member, and a capping carrier securing the glass run seal in contact with the slider member. The cover is secured by the capping carrier in flush relation to the exterior surface of the door window.

A fifth aspect of the invention provides a method of assembling a vehicle flush window system on a vehicle. The method comprises securing a receiving bracket of the vehicle flush window system to the vehicle, securing a slider member to an interior surface of a door window, inserting at least part of the slider member into a guide channel of the receiving bracket with a glass run seal interposed between the receiving bracket and the at least part of the slider member, securing a capping carrier in stationary relation to the receiving bracket, and securing a cover to the capping carrier in flush relation to an exterior surface of the door window.

According to an embodiment of the above aspects, the slider member comprises a slider body configured to be received in the guide channel and a foot integrally formed with the slider body and configured to be secured to the interior surface of the door window.

According to another embodiment of the above aspects, the receiving bracket comprises a channel-forming inset defining the guide channel.

According to yet another embodiment of the above aspects, the glass run seal extends along an exterior face of the receiving bracket beyond the guide channel.

According to still another embodiment of the above aspects, the glass run seal is made of a thermoplastic elastomer.

According to a further embodiment of the above aspects, the capping carrier comprises an inner carrier leg, and the capping carrier is configured to be secured to the receiving bracket so that the inner carrier leg extends into the guide channel. In a particular example of this embodiment, the inner carrier leg is interposed between the glass run seal and the receiving bracket.

According to a yet further embodiment of the above aspects, the glass run seal comprises an articulating portion, and the capping carrier comprises an outer carrier leg engageable with the articulating portion to lock the articulating portion into contact with the slider member.

According to another embodiment of the above aspects, the capping carrier comprises an outer carrier leg having an end, and the glass run seal comprises an articulating portion engageable with the end of the outer carrier leg.

According to yet another embodiment of the above aspects, the glass run seal comprises at least one lip in sealing engagement with the interior surface of the door window when the interior surface of the door window is secured to the slider member and the at least part of the slider member is slidingly received in the guide channel.

According to a further embodiment of the above aspects, the slider member comprises y-axis biasing members and/or x-axis biasing members contacting the glass run seal.

The above aspects and embodiments may be combined and practiced with one another in any combination, including in combination with further exemplary embodiments described below and illustrated in the drawings.

Other aspects and embodiments of the invention, including vehicles, structures, components, assemblies, apparatus, kits, methods and processes of making and using, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain principles of the invention. In such drawings:

FIG. 3 is a cross-sectional view of a first flush door glass guide system taken along sectional line 3-3 of FIG. 2;

FIG. 4 is a cross-sectional view showing an assembly step for making the first flush door glass guide system of FIG. 3;

FIG. 5 is a cross-sectional view showing another assembly step for making the first flush door glass guide system of FIG. 3;

DESCRIPTION OF EMBODIMENTS

Figure 1:
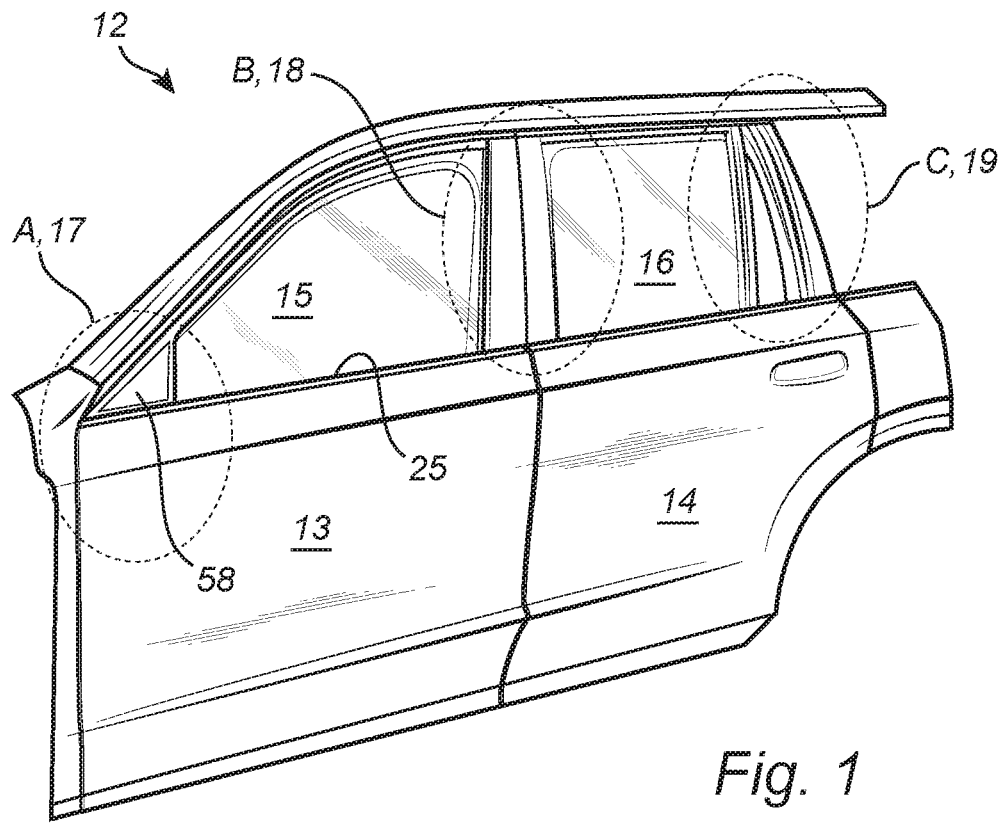
FIG. 1 is a side perspective, fragmented view of a vehicle according to an embodiment of the invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

A fragmented view of a vehicle according to an exemplary embodiment of the invention is generally designated by reference numeral 12 in FIG. 1. In the exemplary embodiment depicted in the drawings, the vehicle 12 is shaped as a sedan. It should be understood that the principles and features of the present invention may be applied to other vehicle body types, including coupes, sport utility vehicles (SUVs), hatchbacks, crossovers, etc. The principles of the present invention are applicable to gas-driven vehicles, electric-powered vehicles, hybrids, and other types of powered and non-powered vehicles.

The vehicle 12 includes compartment openings for ingress and egress of the driver and passengers into and out of an interior compartment of the vehicle 12. As best shown in FIG. 1, a front door 13 and a rear door 14 are provided at the compartment openings. Known hinge devices may be provided to allow opening and closing of the front door 13 and the rear door 14. The front door 13 includes a front door window 15, which has an exterior surface 15*a* and an opposite interior surface 15b. Likewise, the rear door 14 includes a rear door window 16 having an exterior surface and an opposite interior surface (unnumbered). The door windows 15 and 16 are typically made of glass, which may be tinted or untinted. Although not shown, it should be understood that the opposite side of the vehicle 12 typically will include a separate set of front and rear doors with front and rear door windows.

Each side of the vehicle 12 includes at least three pillars. A front "A" pillar area 17 is positioned forward of the front door window 15. A middle "B" pillar area 18 is interposed between a rear edge of the front door window 15 and a front edge of the rear door window 16. A rear "C" pillar area 19 is positioned rearward of a rear edge of the rear door window 16. (The vehicle 12 may include fewer pillars, for example, in the case of a two-door coupe.) The pillar areas 17, 18, and/or 19 may include divider bars, such as shown in connection with the rear "C" pillar area 19 in FIGS. 1 and 2.

The front door window 15 and the rear door window 16 are each provided with respective lifters/carriers (not shown) for independently raising the front door window 15 and the rear door window 16 above a beltline (or waistline) 25, and for independently lowering the front and rear door windows 15 and 16 below the beltline 25. The lifter/carriers are located in, and the door windows 15 and 16 are lowered into, cavities of the doors 13 and 14. The door cavities are interposed between an exterior panel and an interior panel (unnumbered) of the doors 13 and 14. The lifters/carriers may be operator (e.g., driver or passenger) controlled, as is known in the art. Additionally, the lifters/carriers may be automatically controlled, such as to automatically raise the front and rear door windows 15 and 16 when the vehicle 12 is turned off.

The front door 13 includes a front door window frame 21 including a first (forward) lateral frame part and a second (rearward) lateral frame part at opposite side edges of the front door window 15, and a header frame part extending between upper end portions of the first and second lateral frame parts. The beltline 25 extends between lower end portions of the first and second lateral frame parts. The front door window frame 21 defines an opening that is closed when the front door window 15 is in the raised position and opened when the front door window 15 is lowered into the cavity of the front door 13. The structure and operation of the rear door 14 and rear door window 16 are substantially the same, and therefore are not repeated in the interest of brevity.

A first flush door glass guide system (or first guide system) 30 is positioned at the front "A" pillar area 17 and is associated with a front edge 15c (FIG. 3) of the front door window 15. Second and third flush door glass guide systems (or second and third guide systems) 32 and 34 are positioned at the middle "B" pillar area 18 and are associated with a rear edge 15d (FIG. 6) of the front door window 15 and a front edge of the rear door window 16, respectively. A fourth flush door glass guide system (or fourth guide system) 36 is positioned at the rear "C" pillar area 19 and is associated with a rear edge of the rear door window 16. The guide systems 30, 32, 34, and 36 form the substantially vertical glass runs for the front door window 15 and the rear door window 16. The first and fourth guide systems 30 and 36 are mirror images of one another. The second and third guide systems 32 and 34 are mirror images of one another.

Each of the guide systems 30, 32, 34, and 36 extends above the beltline 25 and below the beltline 25 into the door cavity between an outer door panel or skin and an inner door panel. The guide systems 30, 32, 34, and 36 may be shorter than shown in FIG. 2 to extend a smaller depth into the door cavity below the beltline 25.

FIG. 3 is an enlarged cross-sectional view of the first flush door glass guide system (or first guide system) 30. The first guide system 30 includes a slider rail or slider member (also referred to as a runner) 40 associated with a front lateral edge 15c area of the front door window 15 and positioned interiorly with respect to the interior surface 15b of the front door window 15. As referred to herein, interior or interiorly means towards the interior passenger compartment of the vehicle 12, and exterior or exteriorly means away from the interior passenger compartment and towards the exterior of the vehicle 12.

The slider rail (also referred to herein as a runner) 40 includes a foot 42 securely attached to the interior side surface 15b of the front door window 15 proximal to the front lateral edge 15c of the front door window 15. Attachment of the foot 42 to the interior side surface 15b preferably is achieved by adhesive bonding.

The slider rail 40 further includes a slider body 44 preferably integrally formed with the foot 42. The slider body 44 and the foot 42 collectively provide the slider rail 40 with a hook-shaped cross-sectional profile. The slider body 44 includes a forward lateral portion 45 opposite to the foot 42. The forward lateral portion 45 protrudes forward of the front lateral edge 15c of the front door window 15.

The slider body 44 includes a plurality of contacts, including at least a first contact 46 and a second contact 47. The first contact 46 extends from an interiorly facing surface of the slider body 44. The second contact 47 extends from an exteriorly facing surface of the slider body 44.

Figure 2:
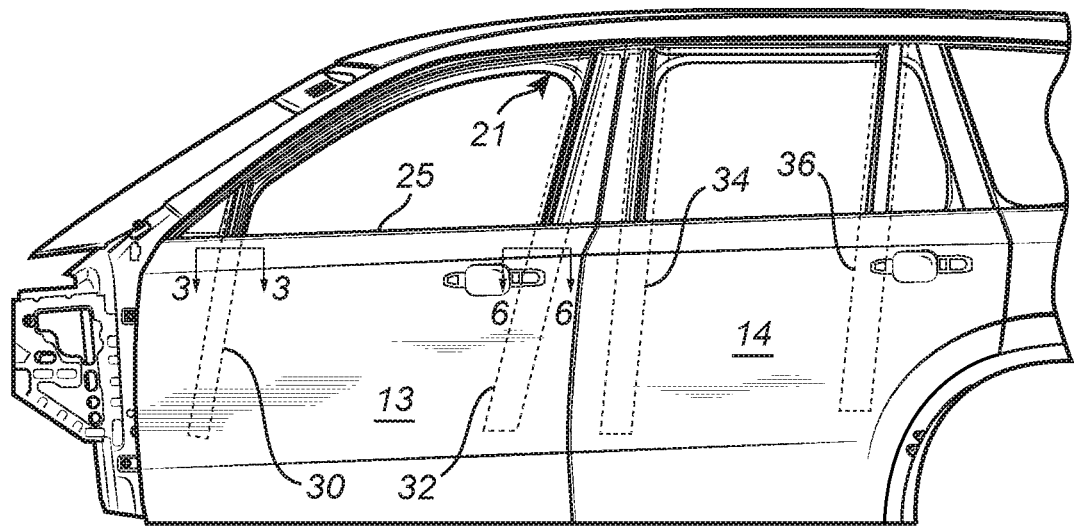
FIG. 2 is a side, fragmented, partially cut-away view of the vehicle of FIG. 1.

A guiding structure of the first guide system 30 on which the slider rail 40 is slidably mounted will now be described. The guiding structure, generally designated by reference numeral 48 in FIGS. 3-5, is set back interiorly with respect to the interior surface 15b of the front door window 15. As best shown in FIG. 2, the guiding structure 48 is mountable to the first lateral frame part of the front door window frame 21 above the beltline 25, and to the interior panel (and/or the exterior panel) of the front door 13 below the beltline 25. The guiding structure 48 thus extends continuously above and below the beltline 25.

As will be discussed in further detail below, the guiding structure 48 includes a receiving member or bracket 50, a capping carrier 60, and a glass run seal (GRS) 70.

The receiving bracket 50 is bent or shaped to include a channel-forming inset 52 with opposite ends 52a and 52b and a recessed connection segment 52c extending between the ends 52a and 52b. The opposite ends 52a and 52b and the recessed connection segment 52c collectively define a guide channel 54 that slidably receives at least a portion of the slider rail 40 (in particular, at least a portion of the slider body 44). The receiving member 50 may be made of, for example, metal (e.g., steel or aluminum), plastic, composite, other material, or a combination thereof.

The capping carrier 60 includes an inner carrier leg 62 and an outer carrier leg 64 extending perpendicularly to the inner carrier leg 62. The inner carrier leg 62 extends interiorly and is received in the guide channel 54. The inner carrier leg 62 is interposed between the forward end 52a of the channel-forming inset 52 of the receiving bracket 50 and part of the glass run seal 70, discussed below. The capping carrier 60 may be made of, for example, metal, plastic, composite, other material, or a combination thereof.

The capping carrier 60 is securable to the receiving bracket 50. According to an exemplary embodiment shown in FIGS. 3 and 5, one or more fasteners 56, such as screw(s), bolt(s), rivet(s), or combinations thereof, secure the capping carrier 60 to the receiving bracket 50.

An "A"-pillar cover or capping panel 58 having an exterior surface 58a and an opposite interior surface 58b is secured to the capping carrier 60 to conceal internal parts (e.g., the capping carrier 60 and the fastener 56) while providing a decorative appearance. The capping panel 58 may be made of, for example, plastic, metal, composite, other material, or a combination thereof. Fasteners, adhesive, or other techniques may be used for securing the capping panel 58 to the capping carrier 60. In another embodiment, the capping panel 58 may be integral with capping carrier 60, so that the capping carrier 60 and the capping panel 58 integrally connected to or formed therewith constitute a one-piece member.

As best shown in FIG. 3, the "A"-pillar capping panel 58 has a rear edge 58c adjacent to and spaced from the front lateral edge 15c of the front door window 15 when the front door window 15 is in its raised position. The exterior surface 58a of the "A"-pillar capping panel 58 is substantially flush with the exterior surface 15a of the front door window 15 when the front door window 15 is in the raised position. As will be discussed below in connection with FIG. 6, the exterior surface 15a of the front door window 15 also is flush with an exterior surface 158a of a "B"-pillar capping panel 158 when the front door window 15 is in the raised position.

The guiding structure 48 further includes the glass run seal 70. For explanatory purposes, the glass run seal (GRS) 70 is discussed in terms of a first GRS portion 72, a second GRS portion 74, a third GRS portion 76, and a fourth GRS portion 78.

The first GRS portion 72 extends along a part of the receiving bracket 50 extending beyond (to the right in FIGS. 3-5) the guide channel 54. The first GRS portion 72 faces and is parallel to and spaced from the interior surface 15b of the front door window 15, and has a split (or Y-shaped) end for engaging an internal panel or other part of the vehicle. The second GRS portion 74 lines the rear end 52b and most of the recessed connection segment 52c of the channel-forming inset portion 52. The third GRS portion 76 is configured to articulate relative to the second GRS portion 74 into a perpendicular relationship to facilitate assembly. The third GRS portion 76 is positioned on an opposite side of the inner carrier leg 62 relative to the forward end 52a of the channel-forming inset portion 52. The fourth GRS portion 78 is configured to articulate relative to the third GRS portion 76 into a perpendicular relationship to facilitate assembly. In the assembled state shown in FIG. 3, the fourth GRS portion 78 terminates at a U-shaped end that captures an end of the outer carrier leg 64, which secures or locks the articulating fourth GRS portion 78 in place in contact with the second contact 47 of the slider body 44.

In a particularly exemplary embodiment, the first GRS portion 72 is made of a thermoplastic vulcanizate (or thermoplastic elastomer) (TPV), and the second, third, and fourth GRS portions 74, 76, and 78 are made of a polymer or copolymer, such as polypropylene. It should be understood that the identified materials are exemplary, and not exhaustive of the possible materials that may be selected for the glass run seal 70. The GRS portions 72, 74, 76, and 78 may be made of the same or different materials from one another, and may be extruded/co-extruded with one another.

The first contact 46 of the slider body 44 abuts against and is slidable relative to an exterior facing surface of the second GRS portion 74 lining the channel-forming inset 52. The second contact 47 of the slider body 44 abuts against and is slidable relative to an interior facing surface of the fourth GRS portion 78. A surface of the glass run seal 70 facing the slider member 40 may be provided with a low friction sliding material (or slip coating) 79, such as a slip coating or film, to reduce fraction between the GRS 70 and the first and second contacts 46 and 47 when the slider member 40 slidingly moves relative to the guiding structure 48 during window raising and lowering operations. The low friction sliding material (or slip coating) 79 may be applied to the GRS 70 using any suitable technique, including coextrusion or spraying. The low friction sliding material 79 may have a thickness of, for example, about 0.3 mm, and may be made of, for example, low friction thermoplastic elastomer.

The positioning of the first and second contacts 46 and 47 on opposite interior and exterior surfaces of the slider body 44 eliminates or substantially reduces y-axis movement (i.e., movement parallel to the width of the vehicle) of the slider member 40 and the front door window 15 secured thereto.

The first contact 46 and the second contacts 47 may be integrally formed with the slider body 44, such as during extrusion, or may be discrete members attached to the slider body 44. The first and second contacts 46 and 47 may comprise protuberances. According to another embodiment discussed below in connection with FIGS. 10-14, either or both of the first and second contacts 46 and 47 may comprise y-axis biasing members or parts, such as resilient extensions or flanges having spring-like action for allowing limited y-axis movement of the slider member 40 and the front door window 15 secured thereto.

The first GRS portion 72 includes a first lip 80 and a second lip 82 for providing sealing engagement with the interior surface 15b of the front door window 15. Likewise, the fourth GRS portion 78 includes a third lip 84 for providing further sealing engagement with the interior surface 15b of the front door window 15. The lips 80, 82, and 84 are depicted pressed against the interior surface 15b of the first door window 15 in an elastically deformed state. The lips 80, 82, and 84 may be made of, for example, a TPV. Slip coatings or films 81, 83, and 85 may be applied to the lips 80, 82, and 84, respectively.

As mentioned above, the fourth GRS portion 78, together with the third lip 84 attached thereto, is configured to articulate relative to the third GRS portion 76. This articulating feature is particularly useful in assembling the first guide system 30. Referring more specifically to an assembly sequence shown in FIGS. 4 and 5, an exemplary method of the invention for assembling the first flush door glass guide system (or first guide system) 30 will now be described.

The receiving bracket 50 is secured to the door 13, for example, using fasteners, welding, adhesive, another securing technique, or a combination thereof. Prior to or after securing the receiving bracket 50 to the door 13, the glass run seal (GRS) 70 is secured to the receiving bracket 50, for example, using adhesive, welding, fasteners, another securing technique, or a combination thereof.

Referring to FIG. 4, the slider body 44 of the slider rail 40 is inserted into the guide channel 54 so that the first contact 46 engages the sliding material 79 on the exterior facing surface of the second GRS portion 74. As best shown in FIG. 4, the fourth GRS portion 78 is articulated exteriorly (downward in FIG. 4) to provide adequate space to allowing insertion of the slider body 44. Preferably, the inner surface 15b of the front door window 15 is secured (e.g., with adhesive) to the foot 42 of the slider rail 40 prior to insertion of the slider body 44 into the guide channel 54, although the front door window 15 may be secured to the foot 42 after insertion of the slider body 44 into the guide channel 54.

The fourth GRS portion 78 is then articulated interiorly (upward in FIG. 4 as shown by the arrow) so that the sliding material 79 on the fourth GRS portion 78 engages the second contact 47. A "fishbone" or flat stick may be used to press the third lip 84 past the front lateral edge 15c of the front door window 15.

As shown in FIG. 5, the capping carrier 60 is then assembled into the first guide system 30 by inserting the inner carrier leg 62 into the guide channel 54 between the third GRS portion 76 and the front end 52a of the channel-forming inset 52 of the receiving bracket 50. The end of the outer carrier leg 64 snaps into place in and is captured by the U-shaped end of the fourth GRS portion 78. The fastener 56 is inserted to secure the capping carrier 60 to the receiving bracket 50. With the capping carrier 60 locked in place by the fastener 56, the outer carrier leg 64 secures or locks the articulating fourth GRS portion 78 in place against the second contact 47. The "A"-pillar cover or capping panel 58 is then secured to the capping carrier 60 using, for example, fasteners, adhesive, welding, another securing technique, or a combination thereof.

Figure 6:
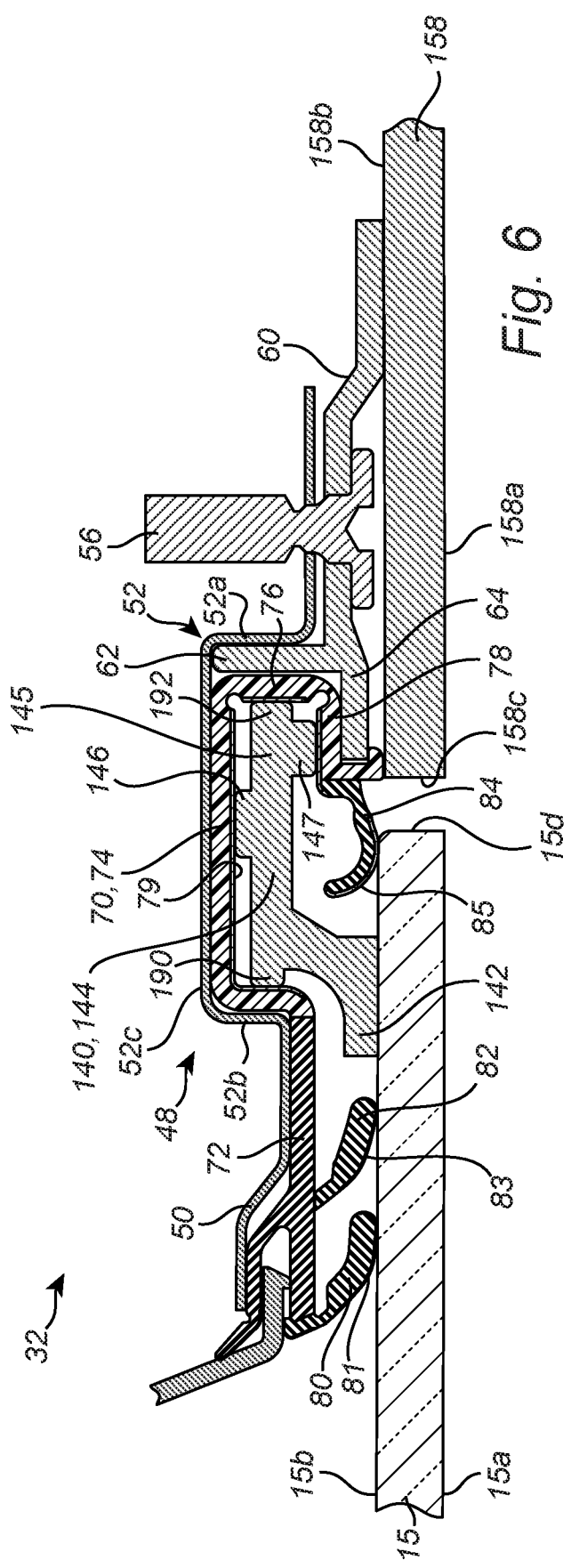
FIG. 6 is a cross-sectional view of a second flush door glass guide system taken along sectional line 6-6 of FIG. 2.

The second flush door glass guide system (or second guide system) 32 is positioned at the middle "B" pillar area 18. As best shown in FIG. 6, the second guide system is associated with the rear lateral edge 15d of the front door window 15. The second guide system 32 is a substantially identical, mirror image of the first guide system 30, except where indicated below. Identical reference numerals are used to designate like parts of the first guide system 30 in FIGS. 3-5 and the second guide system 32 in FIG. 6. The above description of those corresponding parts of the first guide system 30 is incorporated herein by reference with respect to the description of the second guide system 32.

The second guide system 32 includes a slider rail or slider member (also referred to as a runner) 140 associated with the rear lateral edge 15d of the front door window 15 and positioned interiorly with respect to the interior surface 15b of the front door window 15. The slider rail 140 includes a foot 142 and a slider body 144 integrally formed with the foot 142. The foot 142 and the slider body 144 provide the slider rail 140 with a hook-shaped cross-sectional profile. The slider body 144 includes a rear lateral portion 145 opposite to the foot 142. The rear lateral portion 145 protrudes rearward of the rear lateral edge 15d of the front door window 15. The slider body 144 includes a plurality of contacts, including at least a first contact 146, a second contact 147, a third contact 190, and a fourth contact 192.

The guiding structure of the second guide system 32 on which the slider rail 140 is slidably mounted is the mirror image of the guiding structure 48 of FIGS. 3-5. Accordingly, like reference numerals are used to designate like parts of the guiding structure 48 of the second guide system 32. The guiding structure, generally designated by reference numeral 48 in FIG. 6, is mountable to the second lateral frame part of the front door window frame 21 above the beltline 25, and to the interior panel (and/or the exterior panel) of the front door 13 below the beltline 25.

As best shown in FIG. 6, the capping carrier 60 of the second guide system 32 permits mounting of a "B"-pillar cover or capping panel 158 having an exterior surface 158a and an opposite interior surface 158b to conceal internal parts (e.g., the capping carrier 60 and the fastener 56) while providing a decorative appearance. The capping panel 158 may be made of, for example, plastic, metal, composite, or other materials. The capping carrier 60 and the capping panel 158 are depicted as a two-piece construction. It should be understood that the capping carrier 60 and the capping panel 158 may be a one-piece construction, such as integrally formed with one another.

The "B"-pillar capping panel 158 has a front edge 158c adjacent to and spaced from the rear lateral edge 15d of the front door window 15 when the front door window 15 is in its raised position. The exterior surface 158a of the "B"-pillar capping panel 158 is substantially flush with the exterior surface 15a of the front door window 15 when the front door window 15 is in the raised position.

The first and second contacts 146 and 147 are identical to the first and second contacts 46 and 47 of the first guide system 30. The first contact 146 extends from an interiorly facing surface of the slider body 144, and abuts against and is slidable relative to the sliding material 79 on the exterior facing surface of the second GRS portion 74 lining the channel-forming inset 52. The second contact 147 extends from an exteriorly facing surface of the slider body 144, and abuts against and is slidable relative to the sliding material 79 on the interior facing surface of the fourth GRS portion 78. The positioning of the first and second contacts 146 and 147 on opposite interior and exterior surfaces of the slider body 144 eliminates or substantially reduces y-axis movement (i.e., with respect to the width of the vehicle) of the slider member 140 and the front door window 15 secured thereto.

The first guide system 30 does not include components corresponding to the third and fourth contacts 190 and 192 of the second guide system 32 for reasons explained below. The third contact 190 extends from a forward end of the slider body 144 to abut against and slide relative to the sliding material 79 on a part of the second GRS portion 74 lining the end 52b of the channel-forming inset 52. The fourth contact 192 extends from the rear lateral portion 145 of the slider body 144 to abut against and slide against the sliding material 79 on the third GRS portion 76 lining the end 52a of the channel-forming inset 52. The positioning of the third and fourth contacts 190 and 192 respectively on opposite ends of the slider body 144 eliminates or substantially reduces x-axis movement (i.e., with respect to the length of the vehicle) of the slider member 140 and the front door window 15 secured thereto. The absence of comparable third and fourth end contacts from the first guide system 30 allows for x-direction tolerances during assembly.

The contacts 146, 147, 190, and 191 may be integrally formed with the slider body 144. Alternatively, the contacts 146, 147, 190, and 192 may be separate members attached to the slider body 144. The contacts 146, 147, 190, and 191 may comprise protuberances. According to another embodiment discussed below in connection with FIGS. 10-14, either or both of the first and second contacts 146 and 147 may comprise y-axis biasing members or parts, such as resilient extensions or flanges having spring-like action for allowing limited y-axis movement of the slider member 40 and the front door window 15 secured thereto. According to another embodiment, either or both of the third and fourth contacts 190 and 192 may comprise x-direction biasing members or parts, such as resilient extensions or flanges having spring-like action, for allowing limited x-direction movement of the slider member 40 and the front door window 15 secured thereto.

In operation, the front door window 15 is guided by the first and second guide system 30 and 32 when being moved between the raised and lowered positions. More specifically, the slider rails 40 and 140 of the first and second guide systems 30 and 32 fixed (e.g., adhered) to the front door window 15 are guided along the guiding structures 48 of the first and second guide systems 30 and 32.

Although not shown, a glass runner header may be mounted to the window frame to extend between the tops of the first and second guide systems 30 and 32. The glass runner header may have, for example, a conventional U-shape to receive the upper edge of the glass window 15 when in its raised, closed position. In the case of such a conventional glass runner header, the exterior surface 15*a* of the front door window 15 will not be flush with, but will be set back from, the molding above the window 15.

The third guide system 34 is an identical, mirror image of the second guide system 32, except that the third guide system 34 is associated with a front edge of the rear door window 16, whereas the second guide system 32 is associated with the rear edge of the front door window 15. Likewise, the fourth guide system 36 is an identical, mirror image of the first guide system 30, except that the fourth guide system 36 is associated with a rear edge of the rear door window 16, whereas the first guide system 30 is associated with the front edge of the front door window 15. Accordingly, the third and fourth guide systems 34 and 36 will not be further described herein; rather, the disclosures concerning the first and second guide systems 30 and 32 apply to and are incorporated with respect to the fourth guide systems 36 and the third guide system 34, respectively.

Figure 7:
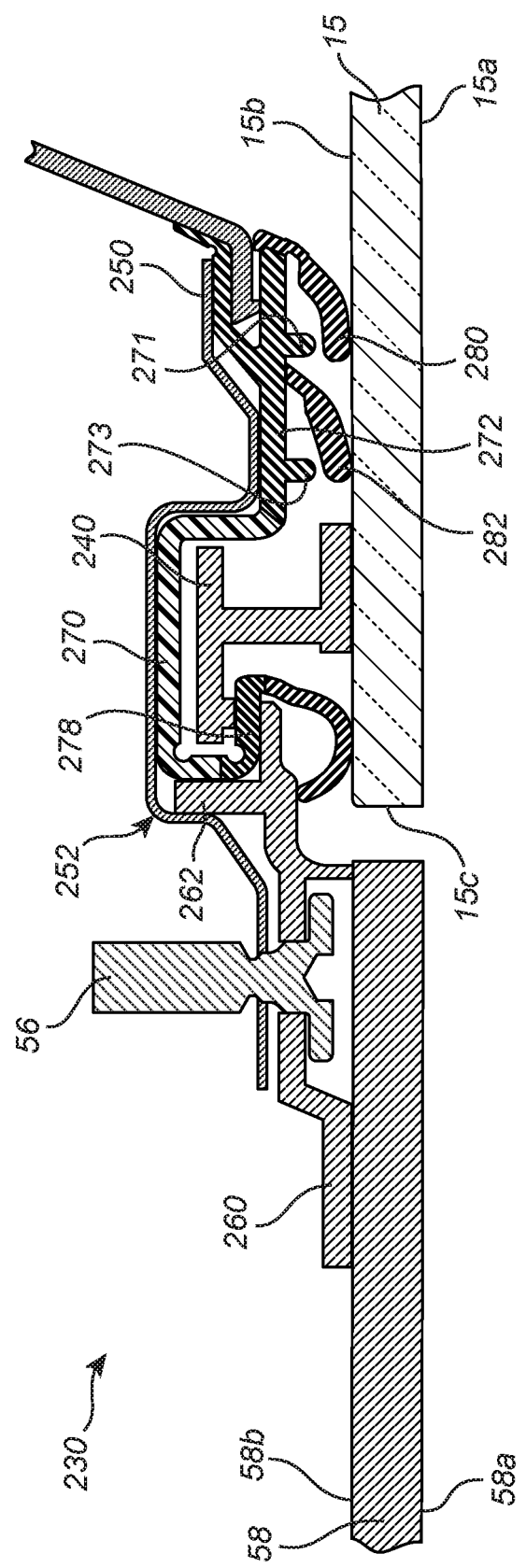
FIG. 7 is a cross-sectional view showing a flush door glass guide system according to another embodiment of the invention.

A guide system according to another embodiment of the invention is generally indicated by reference numeral 230 in FIG. 7, in which like references of the first guide system 30 numerals of FIGS. 3-5 are used to designate corresponding parts of the guide system 230, except with the addition of "200" to the reference numerals in FIG. 7. The above description of those corresponding parts of the first guide system 30 is incorporated herein by reference with respect to the description of the guide system 230.

Figure 9:
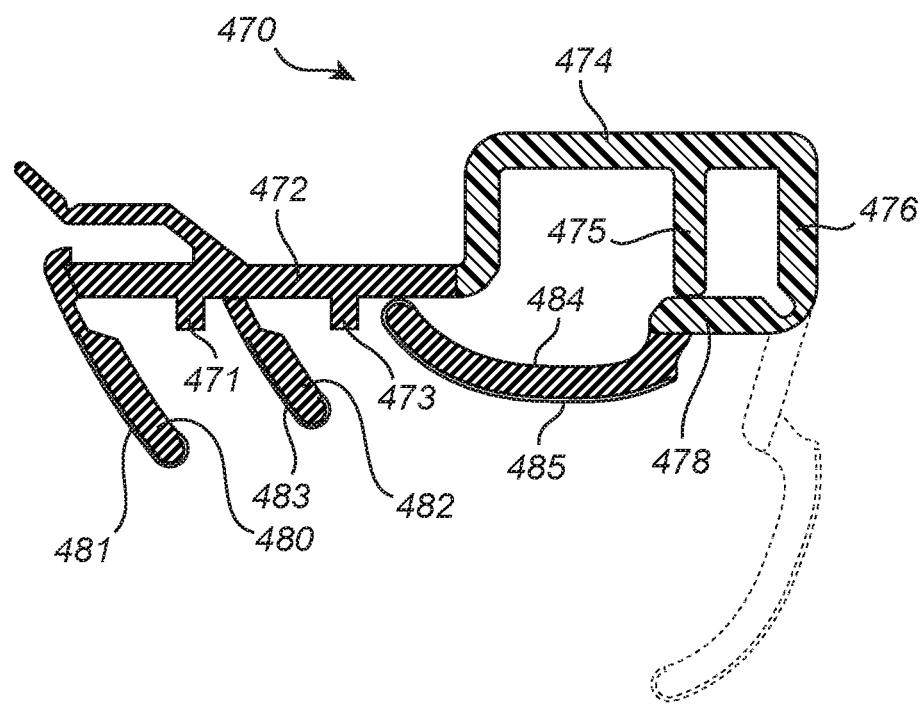
FIG. 9 is a cross-sectional view showing a flush door glass guide system according to another embodiment of the invention.

The guide system 230 of FIG. 9 has a reduced width compared to the first system 30, particularly around a channel-forming inset 252 of a receiving bracket 250. A slider member (also referred to as a runner) 240 and a glass run seal 270 are confined in the x-direction to not extend beyond the edge 15*c* of the door window 15 or a inner carrier leg 262 of a capping carrier 260. Also, a third lip 284 is tucked under an articulating fourth GRS portion 278 and the inner carrier leg 262.

The glass run seal 270 of the guide system 230 also includes stops 271 and 273 configured as ribs integrally formed with a first GRS portion 272. The stops 271 and 273 are in close proximity to lips 280 and 282, respectively. The lips 280 and 282 optionally may provide a biasing function to allow limited y-axis movement of the front door window 15 and the slider member 240 secured thereto. The stops 271 and 273 limit the inward y-axis movement of the front door window 15.

The guide system 230 may be used as an alternative to any of the guide systems described above, including those positioned at the "A" pillar area 17, the "B" pillar area 18, and the "C" pillar area 19.

Figure 8:
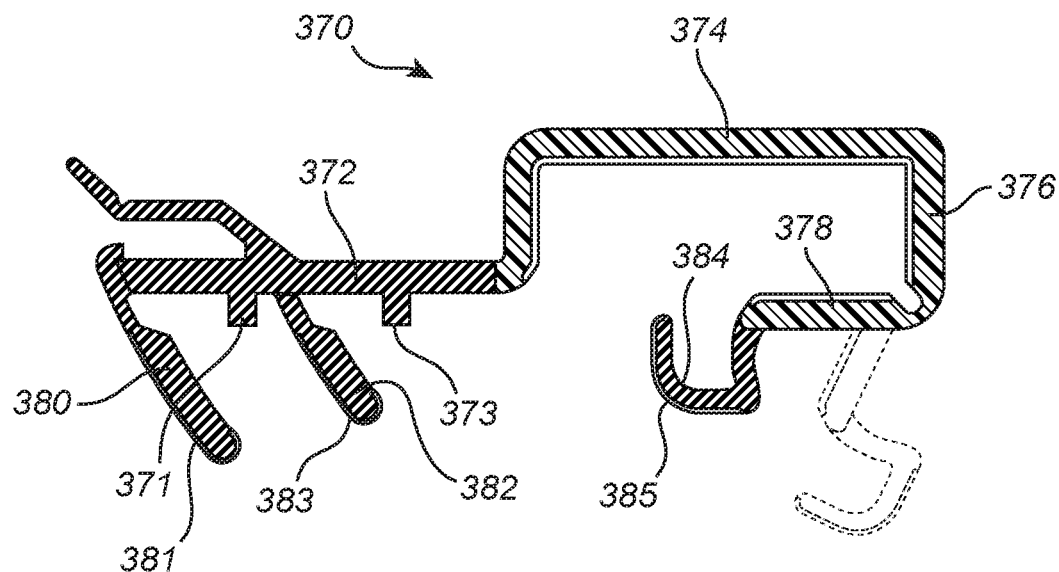
FIG. 8 is a cross-sectional view showing a flush door glass guide system according to another embodiment of the invention.

A glass run seal according to another embodiment of the invention is generally indicated by reference numeral 370 in FIG. 8, in which like references of the first guide system 30 numerals of FIGS. 3-5 are used to designate corresponding parts of the glass run seal 370, except with the addition of "300" to the reference numerals in FIG. 8. The above description of those corresponding parts of the first guide system 30 is incorporated herein by reference with respect to the description of the glass run seal 370.

The glass run seal 370 of FIG. 8 includes a first GRS portion 372, a second GRS portion 374, a third GRS portion 376, and an articulating fourth GRS portion 378. The first GRS portion 372 includes a first lip 380 and a second lip 382 for providing sealing engagement with the interior surface 15*b* of the front door window 15 (not shown in FIG. 8). Likewise, the fourth GRS portion 378 includes a third lip 384 for providing further sealing engagement with the interior surface 15*b* of the front door window 15 (not shown in FIG. 8). The lips 380, 382, and 384 are elastically deformable, and may be made of, for example, a TPV. Slip coatings or films 381, 383, and 385 may be applied to the lips 380, 382, and 384, respectively. The first GRS portion 372 further includes stops 371 and 373 configured as ribs in close proximity to lips 380 and 382 to limit the inward y-axis movement of the front door window 15. The fourth GRS portion 378 is without the U-shaped end of FIG. 3, which as described above is used to capture the end of the outer carrier leg 64.

The glass run seal 370 may be used in any of the guide systems described above, including those positioned at the "A" pillar area 17, the "B" pillar area 18, and the "C" pillar area 19.

A glass run seal according to another embodiment of the invention is generally indicated by reference numeral 470 in FIG. 9, in which like references of the first guide system 30 numerals of FIGS. 3-5 are used to designate corresponding parts of the glass run seal 470, except with the addition of "400" to the reference numerals in FIG. 9. The above description of those corresponding parts of the first guide system 30 is incorporated herein by reference with respect to the description of the glass run seal 470.

The glass run seal 470 of FIG. 9 includes a first GRS portion 472, a second GRS portion 474, a third GRS portion 476, and an articulating fourth GRS portion 478. The first GRS portion 472 includes a first lip 480 and a second lip 482 for providing sealing engagement with the interior surface 15*b* of the front door window 15 (not shown in FIG. 9). Likewise, the fourth GRS portion 478 includes a third lip 484 for providing further sealing engagement with the interior surface 15*b* of the front door window 15 (not shown in FIG. 9). The lips 480, 482, and 484 are elastically deformable, and may be made of, for example, a TPV. Slip coatings or films 481, 483, and 485 may be applied to the lips 480, 482, and 484, respectively. The first GRS portion 472 further includes stops 471 and 473 configured as ribs in close proximity to lips 480 and 482 to limit the inward y-axis movement of the front door window 15. A distal end of the the third lip 484 contacts the first GRS portion 472. The fourth GRS portion 478 is without the U-shaped end of FIG. 3, which as described above is used to capture the end of the outer carrier leg 64.

The glass run seal 470 further includes a middle leg 475 not shown in the previous embodiments. The middle leg 475 extends from the second GRS portion 474 in the Y-direction parallel to the third GRS portion 476 and perpendicular to the interior surface 15*b* of the window 15. A distal end of the middle leg 475 contacts the fourth GRS portion 478.

The glass run seal 470 may be used in any of the guide systems described above, including those positioned at the "A" pillar area 17, the "B" pillar area 18, and the "C" pillar area 19, although the glass run seal 470 is particularly useful for a slanted upper part (not shown) of the "C" pillar area 19, especially those that do not include divider bars.

Figure 10:
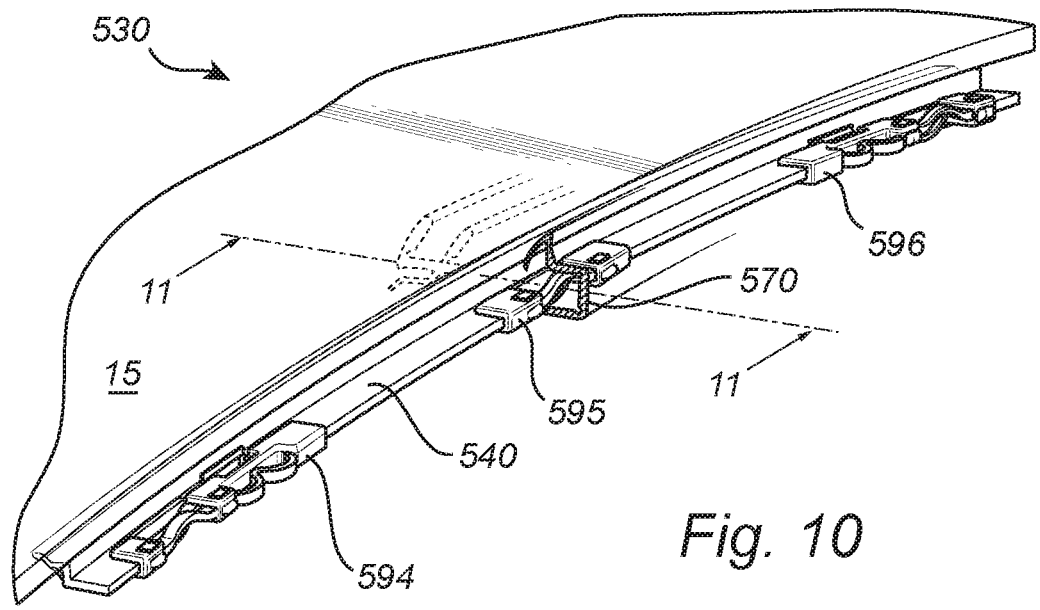
FIG. 10 is a fragmented perspective view of a flush door glass guide system according to a further embodiment of the invention.

A guide system according to another embodiment of the invention is illustrated in FIGS. 10-17 and is generally indicated by reference numeral 530 in FIG. 10. In FIGS. 10-17, like references of the first guide system 30 numerals of FIGS. 3-5 and the second guide system 32 of FIG. 6 are used to designate corresponding parts of the guide system 530, except with the addition of "500" to the reference numerals in FIGS. 10-17. The above description of those corresponding parts of the first guide system 30 and the second guide system 32 are incorporated herein by reference with respect to the description of the guide system 530.

Figure 11:
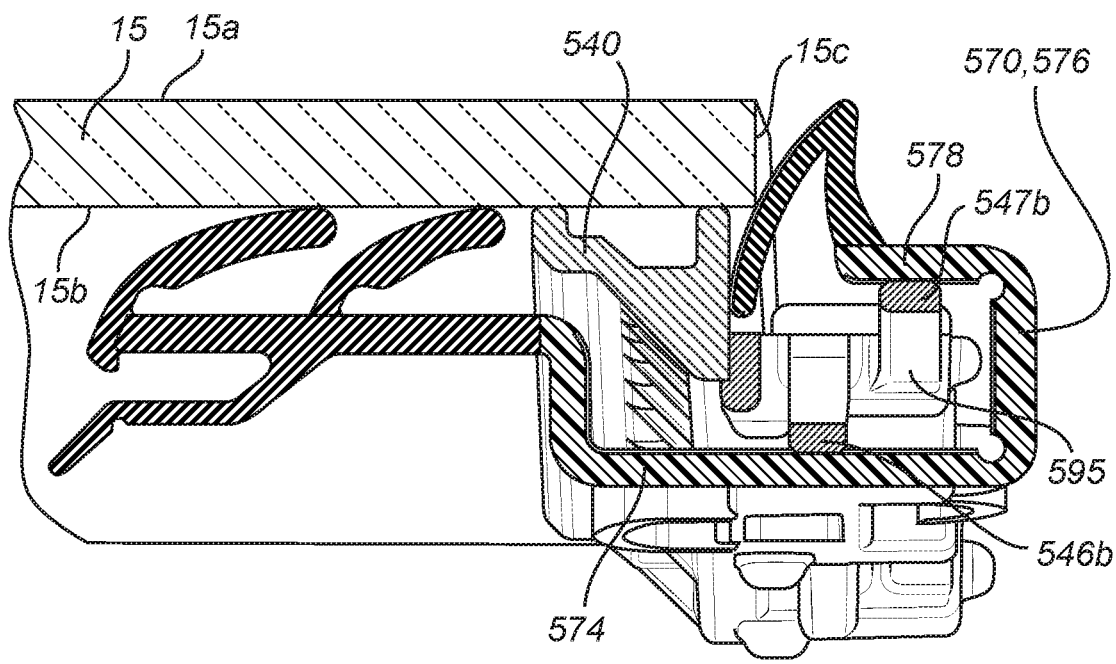
FIG. 11 is a cross-sectional view of the flush door glass guide system of FIG. 10 taken along line 11-11.

As best shown in FIGS. 10 and 11, the guide system 530 includes an elongated slide member (or runner) 540 secured to the window 15 in proximity to its edge 15c. For explanatory purposes, FIG. 10 shows a fragmented sectional view of a glass run seal (GRS) 570 is shown in relation to the slide member 540 and the window 15. The slide member 540 includes three spring units 594, 595, and 596 spaced from one another along the length of the slide member 540.

Figure 12:
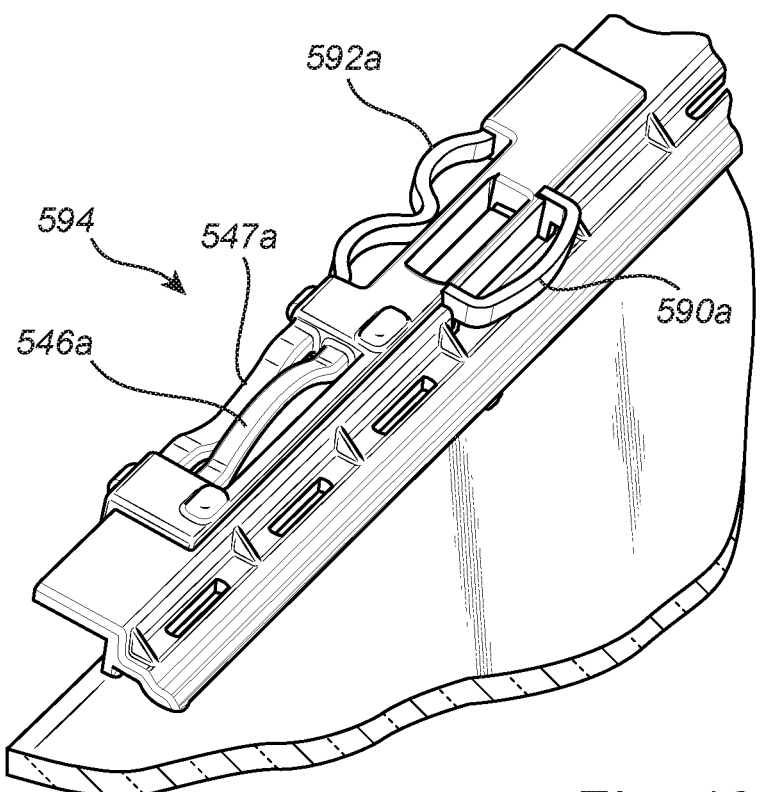
FIG. 12 is a fragmented perspective view of a first spring unit of the flush door glass guide system of FIG. 10.
Figure 13:
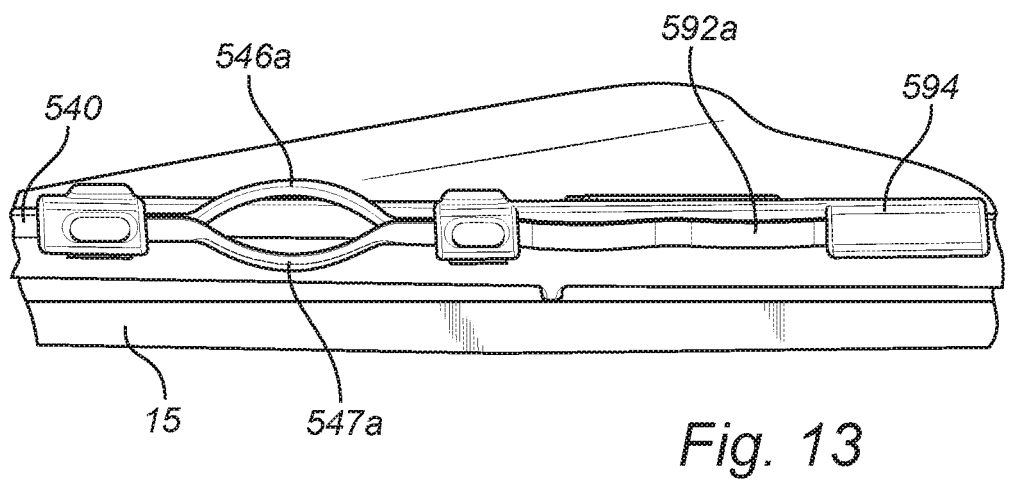
FIG. 13 is a fragmented side view of the first spring unit of FIG. 12.

Referring now to FIGS. 12 and 13, the first spring unit 594 includes a first y-direction biasing member 546a (corresponding to the first contacts 46 and 146) and a second y-direction biasing member 547a (corresponding to second contacts 47 and 147) for allowing limited y-axis movement of the slider member 540 and the door window 15 secured thereto. The first y-direction biasing member 546a abuts against and is slidable relative to an exterior facing surface of a second GRS portion 574 lining a channel-forming inset (not shown in FIGS. 10-17, but corresponding to inset 52). The second y-direction biasing member 547a abuts against and is slidable relative to an interior facing surface of a fourth GRS portion 578. The positioning of the first and second y-direction biasing members 546a and 547a respectively on opposite sides of the slider member 540 eliminates or substantially reduces y-x axis movement (i.e., side-to-side or lateral) of the slider member 540 and the door window 15 secured thereto.

The first spring unit 594 further includes a first x-direction biasing member 590a (corresponding to the third contacts 190) and a second x-direction biasing member 592a (corresponding to the fourth contacts 192) for allowing limited x-direction movement of the slider member 540 and the door window 15 secured thereto. The first x-direction biasing member 590a abuts against and slides relative to a part of the second GRS portion 574 lining the end of the channel-forming inset (not shown in FIGS. 14 and 15). The second x-direction biasing member 592a abuts and slides against the third GRS portion 576 lining the opposite end of the channel-forming inset. The positioning of the first and second x-direction biasing members 590a and 592a eliminates or substantially reduces x-axis movement (i.e., with respect to the length of the vehicle) of the slider member 540 and the door window 15 secured thereto.

The biasing members 546a, 547a, 590a, and 592a may be configured as resilient members or extensions having spring-like action.

Figure 14:
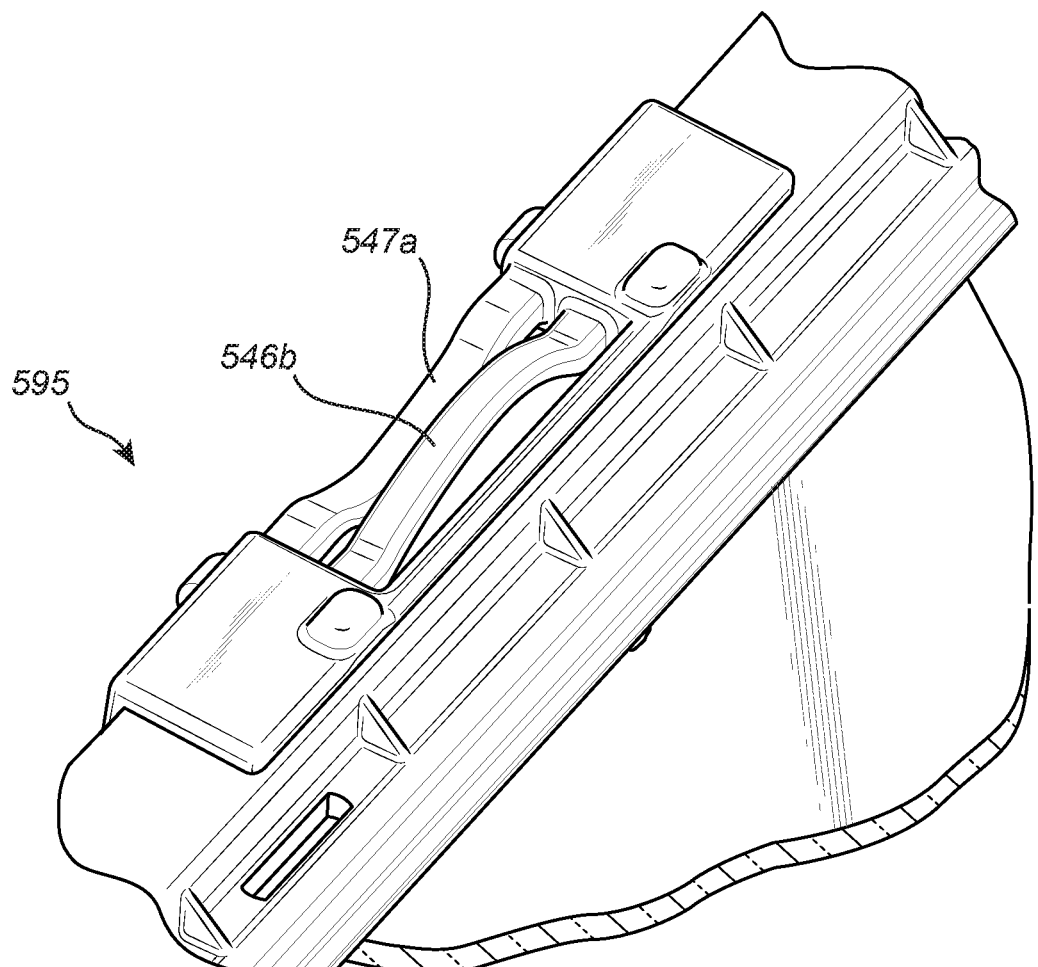
FIG. 14 is a fragmented perspective view of a second spring unit of the flush door glass guide system of FIG. 10.
Figure 15:
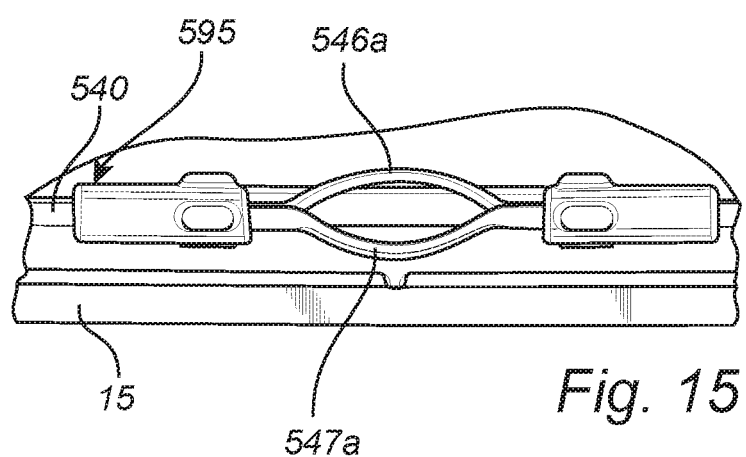
FIG. 15 is a fragmented side view of the second spring unit of FIG. 14.

FIGS. 14 and 15 illustrate a second spring unit 595 including a first y-direction biasing member 546b (corresponding to the first contacts 46 and 146) and a second y-direction biasing member 547b (corresponding to second contacts 47 and 147) for allowing limited y-axis movement of the slider member 540 and the door window 15 secured thereto. The second spring unit 595 does not include x-direction biasing members.

Figure 16:
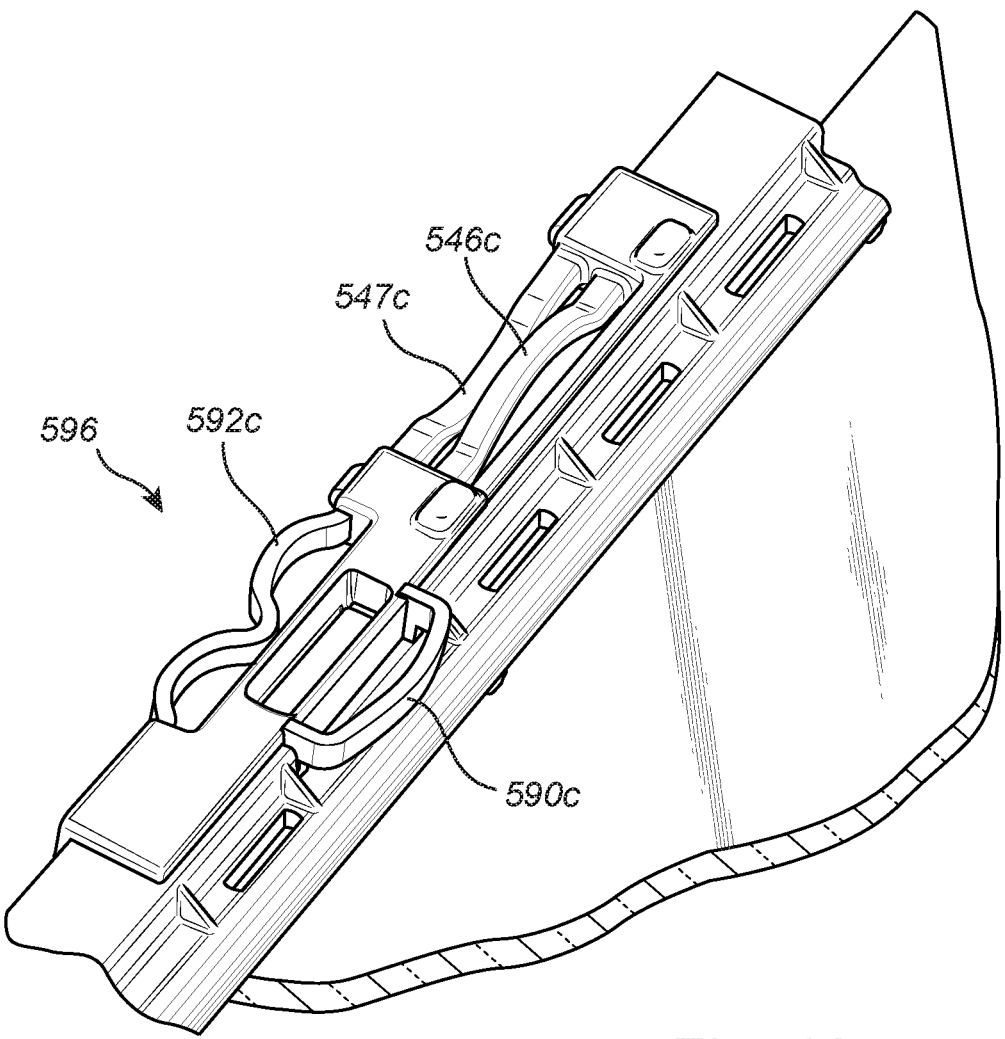
FIG. 16 is an fragmented perspective view of a third spring unit of the flush door glass guide system of FIG. 10.
Figure 17:
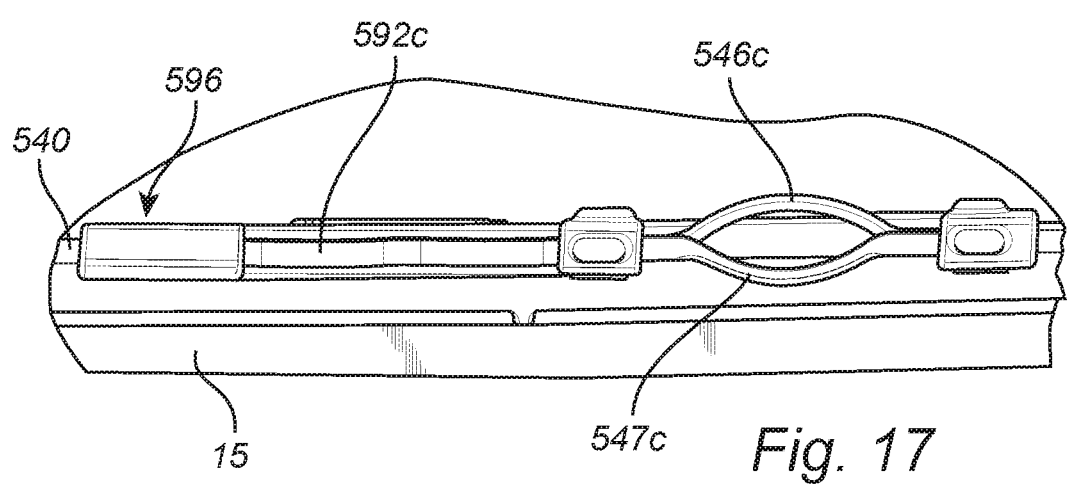
FIG. 17 is a fragmented side view of the third spring unit of FIG. 16.

FIGS. 16 and 17 illustrate a third spring unit 596 including first and second y-direction biasing members 546c and 547c and first and second x-direction biasing members 590c and 592c. The third spring unit 596 is the mirror image of the first spring unit 594, the description of which is incorporated herein with respect to the third spring unit 596.

The spring units 594, 595, and 596 may be used with any one or combination of the guide systems (e.g., 30, 32, 230) and guide system parts described herein. The spring units 594, 595, and/or 596 may be used at any one or combination of the front "A" pillar area 17, the middle "B" pillar area 18, and/or the rear "C" pillar area 19, with the front window and/or rear window. The edge of the window may be provided with one, two, three (as shown), four, or more spring units. Although not shown, the spring unit can be modified to include one or more x-direction biasing members and no y-direction biasing members.

INDUSTRIAL APPLICABILITY

The present invention has utility in connection with raisable and lowerable windows of vehicles, including sedans, coupes, sports utility vehicles (also known as SUVs), and hatchbacks.

Note that not all of the steps described above in the general description or the examples are required, that a portion of a specific step may not be required, and that one or more further steps may be performed in addition to those described. Still further, the order in which steps are described is not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. Modifications include the combination and incorporation of different embodiments with one another. For example, the stops 271 and 273 of FIG. 7 may be incorporated into any of the other embodiments. Alternatively, the guide system 230 of FIG. 7 may be practiced without the stops 271 and 273.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub combination.

What is claimed is:

1. A vehicle flush window system for a vehicle door including a door window having an exterior surface and an opposite interior surface, the vehicle flush window system comprising:
   a slider member configured to be secured to the interior surface of the door window; and
   a guiding structure mountable on the vehicle door, the guiding structure comprising a receiving bracket having a guide channel configured to slidingly receive at least part of the slider member, a glass run seal at least a portion of which is configured to be interposed between the receiving bracket and the slider member when the at least part of the slider member is slidingly received in the guide channel, and a capping carrier configured to lock the glass run seal in contact with the slider member when the interior surface of the door window is secured to the slider member and the at least part of the slider member is slidingly received in the guide channel; wherein, the capping carrier comprises an inner carrier leg, and wherein the capping carrier is configured to be secured to the receiving bracket so that the inner carrier leg extends into the guide channel between the glass run seal and the receiving bracket.

2. The vehicle flush window system of claim 1, wherein the capping carrier is further configured to secure a cover in flush relation to the exterior surface of the door window when the interior surface of the door window is secured to the slider member and the at least part of the slider member is slidingly received in the guide channel.

3. The vehicle flush window system of claim 1, wherein the glass run seal is made of a thermoplastic elastomer.

4. The vehicle flush window system of claim 1, wherein the glass run seal comprises an articulating portion.

5. The vehicle flush window system of claim 4, wherein the capping carrier comprises an outer carrier leg configured to lock the articulating portion in contact with the slider member.

6. The vehicle flush window system of claim 4, wherein the capping carrier is configured to lock the articulating portion in contact with the slider member.

7. The vehicle flush window system of claim 1, wherein the slider member comprises y-axis biasing members contacting the glass run seal.

8. The vehicle flush window system of claim 7, wherein the slider member comprises x-axis biasing members contacting the glass run seal.

9. The vehicle flush window system of claim 1, wherein the slider member and the glass run seal face the interior surface of the door window but are confined not to extend beyond an edge of the door window when the interior surface of the door window is secured to the slider member and the at least part of the slider member is slidingly received in the guide channel.

10. A vehicle flush window system for a vehicle door including a door window having an exterior surface and an opposite interior surface, the vehicle flush window system comprising:
    a slider member configured to be secured to the interior surface of the door window; and
    a guiding structure mountable on the vehicle door, the guiding structure comprising a receiving bracket having a guide channel configured to slidingly receive at least part of the slider member, a glass run seal at least portion of which is configured to be interposed between the receiving bracket and the slider member when the at least part of the slider member is slidingly received in the guide channel, and a capping carrier configured to secure a cover in flush relation to the exterior surface of the door window when the interior surface of the door window is secured to the slider member and the at least part of the slider member is slidingly received in the guide channel; wherein, the capping carrier comprises an inner carrier leg, and wherein the capping carrier is configured to be secured to the receiving bracket so that the inner carrier leg extends into the guide channel between the glass run seal and the receiving bracket.

11. The vehicle flush window system of claim 10, wherein the glass run seal is made of a thermoplastic elastomer.

12. The vehicle flush window system of claim 10, wherein the glass run seal comprises an articulating portion.

13. The vehicle flush window system of claim 12, wherein the capping carrier comprises an outer carrier leg configured to lock the articulating portion in contact with the slider member.

14. The vehicle flush window system of claim 12, wherein the capping carrier is configured to lock the articulating portion in contact with the slider member.

15. The vehicle flush window system of claim 10, wherein the slider member comprises y-axis biasing members contacting the glass run seal.

16. The vehicle flush window system of claim 15, wherein the slider member comprises x-axis biasing members contacting the glass run seal.

17. The vehicle flush window system of claim 10, wherein the slider member and the glass run seal face the interior surface of the door window but are confined not to extend beyond an edge of the door window when the interior surface of the door window is secured to the slider member and the at least part of the slider member is slidingly received in the guide channel.

18. A vehicle flush window system secured to a door including a door window having an exterior surface and an opposite interior surface, the vehicle flush window system comprising:
    a slider member secured to the interior surface of the door window; and
    a guiding structure mounted on the vehicle door, the guiding structure comprising a receiving bracket having a guide channel slidingly receiving at least part of the slider member, a glass run seal at least a portion of which is interposed between the receiving bracket and the slider member, and a capping carrier securing the glass run seal in contact with the slider member; wherein the capping carrier comprises an inner carrier leg, and wherein the capping carrier is configured to be secured to the receiving bracket so that the inner carrier leg extends into the guide channel between the glass run seal and the receiving bracket; and
    a cover secured by the capping carrier in flush relation to the exterior surface of the door window.

* * * * *